United States Patent [19]

Schultheis

[11] Patent Number: 4,603,535

[45] Date of Patent: Aug. 5, 1986

[54] PORTABLE SEALING DEVICE

[75] Inventor: Stephen K. Schultheis, Laguna Hills, Calif.

[73] Assignee: Container Development Company, Costa Mesa, Calif.

[21] Appl. No.: 738,478

[22] Filed: May 28, 1985

[51] Int. Cl.$^4$ .............................................. B65B 7/16
[52] U.S. Cl. ....................................... 53/373; 53/390; 493/133
[58] Field of Search .......................... 53/373, 390, 565; 493/133, 165; 156/583.7, 583.6

[56] References Cited

U.S. PATENT DOCUMENTS

| | | | |
|---|---|---|---|
| 3,296,771 | 1/1967 | Fener | 53/373 |
| 3,869,842 | 3/1975 | Verbeke | 53/373 X |
| 3,956,872 | 5/1976 | Johnson | 493/133 X |
| 4,145,236 | 3/1979 | Neumayer et al. | 493/133 X |
| 4,251,303 | 2/1981 | Deimel et al. | 53/373 X |
| 4,265,696 | 5/1981 | Graves et al. | 53/373 X |
| 4,403,465 | 9/1983 | Bachner | 53/373 X |
| 4,484,977 | 11/1984 | Andersson | 53/373 X |

*Primary Examiner*—James F. Coan
*Attorney, Agent, or Firm*—Walter A. Hackler

[57] ABSTRACT

Portable sealing apparatus for the sealing of plastic coated paperboard cartons includes a frame and a fixed jaw mounted thereto. A single movable jaw is utilized to seal top portions of the carton by fusing of a polyethylene coating thereon. Guide means enable manual placement of the carton with the sealable portions thereon disposed between the fixed and movable jaw. Proper selection of pressure, time and controlled heating of the jaws enables the carton to remain adjacent the fixed jaw before, during and after the sealing thereof, without subsequent remelting of the polyethylene coating and opening of the seal for a period of time.

23 Claims, 7 Drawing Figures

U.S. Patent  Aug. 5, 1986  Sheet 1 of 3  4,603,535
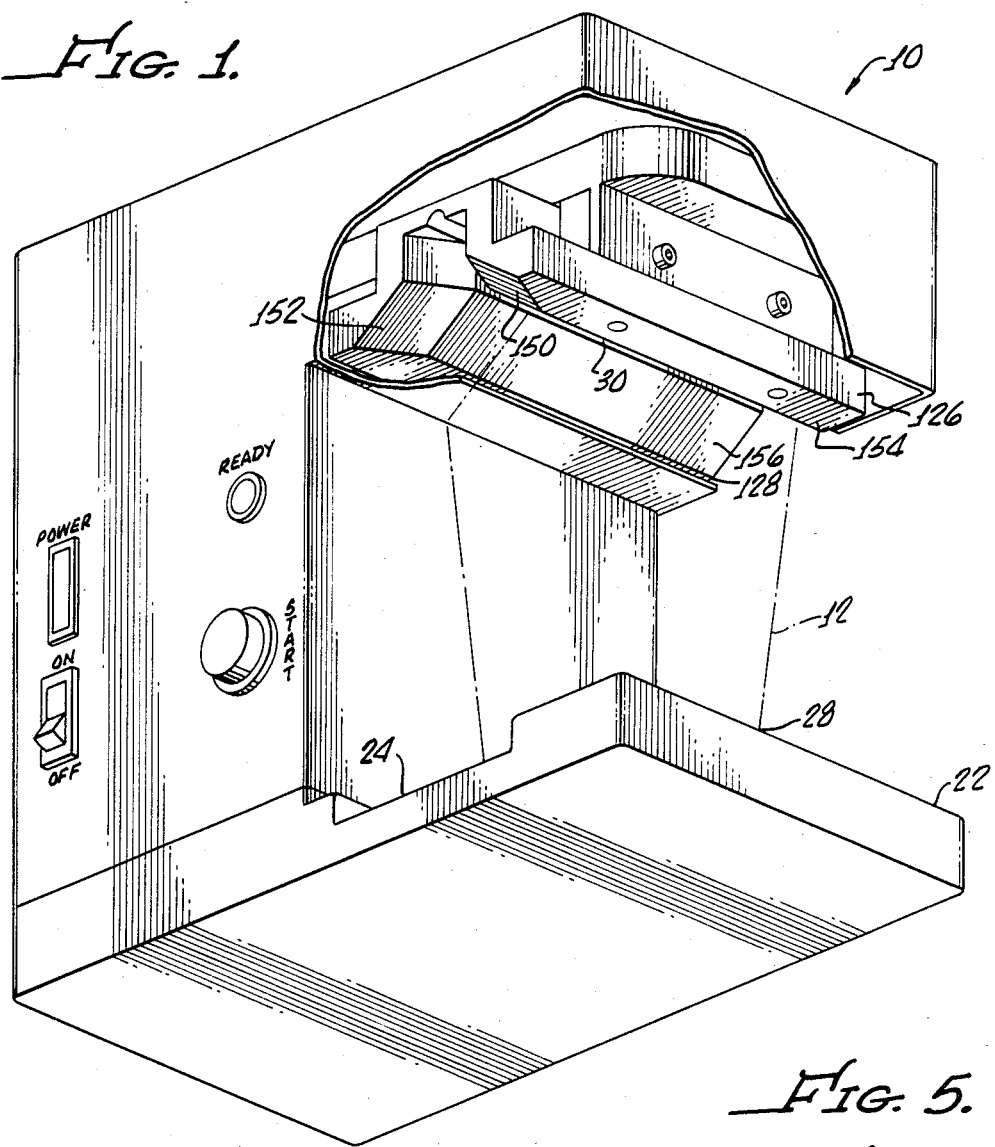
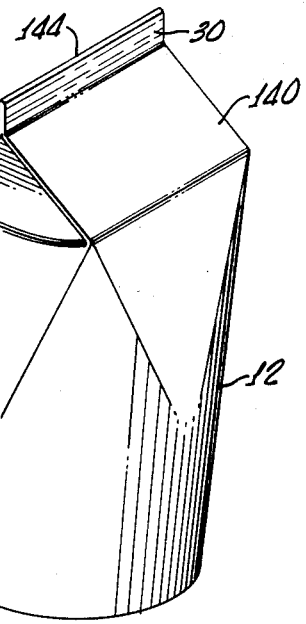
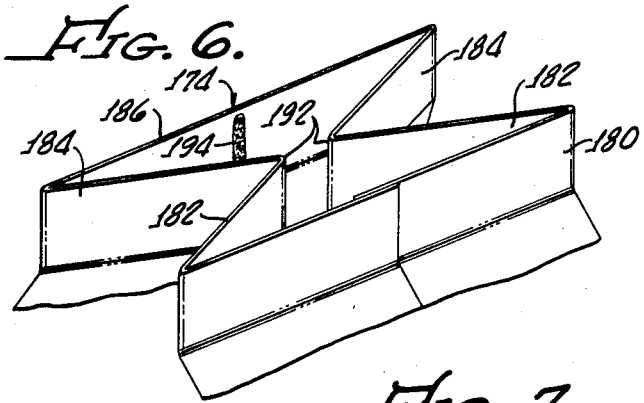
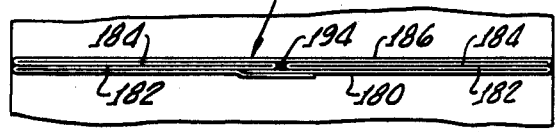

PORTABLE SEALING DEVICE

The present invention is generally related to sealing devices for plastic coated paperboard cartons and, more particularly, is concerned with hand-operated portable sealing devices for use in retail establishments to provide point-of-sale sealing of cartons.

A familiar sight in today's food markets are plastic coated paperboard cartons, such as those used for providing quart and half-gallon quantities of milk and other dairy products.

The well-known folding pattern of the milk container top portion enables gathering of the top portions thereof to enable heat and pressure to be applied thereto for fusing plastic coated paper layers to one another to form a seal.

The sealing of these cartons is, of course, performed at a packaging plant and the sealing devices for the cartons is typically incorporated into an assembly line station. Heated rollers are used to apply sufficient pressure to the gathered milk carton top portions as they are passed therethrough by a conveyor, to seal the carton by fusing the plastic coating thereon.

Heated rollers are utilized in these machines for sealing plastic coated cartons for a number of reasons. They are suitable for high production sealing rates, in that the cartons need not be stopped momentarily during the sealing operation.

Additionally, almost unlimited pressure can be applied to the cartons for sealing and, importantly, the cartons do not remain in contact with the heated rollers after the fusing of the plastic coated paper.

It is well known that continued contact of a heated sealing device with the just sealed carton results in a remelting of the fused plastic coating and subsequent opening of the carton, or a seal which is easily ruptured. Hence, the cartons, during the sealing operation, must pass through the rollers with sufficient speed to prevent such remelting of the plastic coating.

While this sealing process would appear to be straightforward, it requires a significant amount of complicated mechanisms for feeding of the cartons through the heated rollers.

Smaller machines for on-site sealing of plastic coated cartons have been developed. All of these, however, are merely scaled down versions of the high volume commercial sealing devices hereinabove described.

That is, they incorporate heated rollers and a feed mechanism for passing the cartons to be sealed therethrough. While these machines are considerably smaller than the room-sized sealing devices utilized in commercial establishments, such as dairies and the like, they nonetheless typically weigh 100 or more pounds, and are not easily transportable from one location to another.

Other portable sealing devices are in use for sealing polyethylene bags and the like, and are used in the home or for packaging any number of products.

These devices, however, do not require the heat and pressure that is necessary to seal the plastic coating on containers made of paperboard, such as milk cartons.

Other sights becoming more common in food markets are machines for producing freshly squeezed juice products, such as orange juice.

This form of retailing orange juice has become quite popular with consumers because of the freshness of the juice. As orange juice tends to become sour, or bitter, shortly after squeezing, the consumer has concern about the freshness of prepackaged juices which are bottled, or packaged, at a central location and shipped to the food markets.

While providing fresh orange juice to the consumer, this retailing technique is accompanied by a number of problems including economy of space. First, the juice machine takes up a certain amount of floor space in the store. In addition, containers must be provided for packaging the freshly squeezed orange juice.

Heretofore, packaging of freshly squeezed orange juice at super market locations has been accomplished through the use of plastic bottles, utilizing screw top caps for the sealing thereof.

The use of these bottles has a number of significant drawbacks. First, they consume a considerable amount of space, whether full or empty, and, since they cannot be stacked within one another, they are not economical to either store or ship. Additionally, a screw-type cap does not provide a tamper proof seal.

Stackable plastic coated cartons have been developed which are suitable for packaging liquids in a variety of quantities, including pints and quarts.

These containers are similar to the well known milk carton, in they they include the conventional folding patterns of the top of the milk carton, however, the bottom portion thereof has a tapered cylindrical shape, enabling the unfilled cartons to be stacked inside one another. This provides a great economy in storage and shipping costs.

To be useful, however, in connection with the on-site preparation and packaging of orange juice and similar products, these cartons must be sealed at the point-of-sale.

As hereinabove pointed out, sealing machines for such cartons have heretofore been enormous in size, weight, and consequently, cost.

Consequently, to economize both the space and the efficiency of current on-site freshly squeezed juice operations, utilizing stackable cartons which are promptly sealed after filling, a small portable sealing device is necessary.

Obvious requirements for such a machine are that it must be very small, since floor space is at a premium, that it be lightweight, since it must be easily moved about for cleaning of areas surrounding the juicing operation, and it must provide a quality sealing of the cartons such as large machines which seal milk cartons, and the like.

The present invention provides for such a portable sealing device. In addition to the features of small size, portability and quality sealing of cartons at a point-of-sale, the sealer in accordance with the present invention is manually loaded, thus further reducing cost, weight and size requirements.

SUMMARY OF THE INVENTION

In accordance with the present invention, apparatus for sealing plastic coated paperboard cartons includes a fixed jaw mounted to a frame and a movable jaw. Means are provided for heating the fixed and movable jaws and means mounting the movable jaw to the frame enable controlled movement of the movable jaw from a spaced apart relationship with the fixed jaw to a position for providing sufficient pressure to sealable portions of a carton disposed between the fixed and movable heated jaws to cause sealing of the sealable portions.

Means for moving the movable jaw are provided as well as temperature regulation means connected in an operative relationship with the heating means for enabling the carton sealable portions to remain adjacent the fixed jaw after sealing thereof without causing unsealing of the carton sealable portions.

This is an important feature of the present invention in that with proper temperature regulation only one movable jaw is necessary. This eliminates the additional expense mechanism and weight which would be associated with the use of two movable jaws.

In conjunction with this, the apparatus in accordance with the present invention further includes guide means for enabling manual placement of the carton sealable portions between the fixed and movable jaws and adjacent to the fixed jaw.

Because the carton sealable portions can remain in contact for a period of time with the fixed jaw after sealing, without remelting of the plastic on the cartons and reopening of the seal, manual placement and removal of the carton within the apparatus is made possible.

The guide means of the present invention includes a contoured base interconnected to the frame and in a spaced apart relationship therewith for supporting a bottom of the carton in order to position the carton sealable portion between the jaws and adjacent to the fixed jaw.

To facilitate the placement of the carton sealable portions between the jaws, fairing means is provided and disposed adjacent the fixed and movable jaws for moving the carton sealable portions together as the carton is manually pushed between the fixed and movable jaws along the contoured base.

In addition, the fairing means is operative for aligning the carton sealable portions with one another. Fairing means may be spring-mounted to the frame for alignment of the carton sealable portions with one another in order to maximize contact therebetween.

Importantly, the temperature regulation means maintains the fixed jaw temperature between about 260° F. and about 340° F. with a preferred temperature of about 300° F. Similarly, the movable jaw may be maintained at a temperature between 260° F. and about 340° F., although it may be regulated to a higher temperature since it does not remain in contact with the carton after sealing thereof.

Ribs are provided on the faces of the fixed and movable jaw for engaging the sealable portions of the carton and providing pressures thereto greater than about 100 psi.

The means for moving the movable jaw includes a cam controlled lever means for causing a transverse movement of the movable jaw to and from the fixed jaw in a sinusoidal time cycle, with the period of the time cycle being about 12 seconds.

BRIEF DESCRIPTION OF THE DRAWINGS

The advantages and features of the present invention will appear from the following description, considered in conjunction with the accompanying drawings in which:

FIG. 1 is a perspective view of the apparatus in accordance with the present invention for sealing plastic coated paperboard cartons and generally showing a frame, and fairing means for guiding the carton (shown in phantom line), and aligning sealable portions thereof between a fixed and movable jaw;

FIG. 5 is a perspective view of a carton sealed with the apparatus in accordance with the present invention;

FIG. 6 is a cross-sectional view of the sealable portions of the carton in a folded but unsealed position, illustrating the folds; and FIG. 7 is a cross-sectional view similar to that shown in FIG. 6 after sealing thereof by apparatus made in accordance with the present invention.

DETAILED DESCRIPTION

Figure 2:
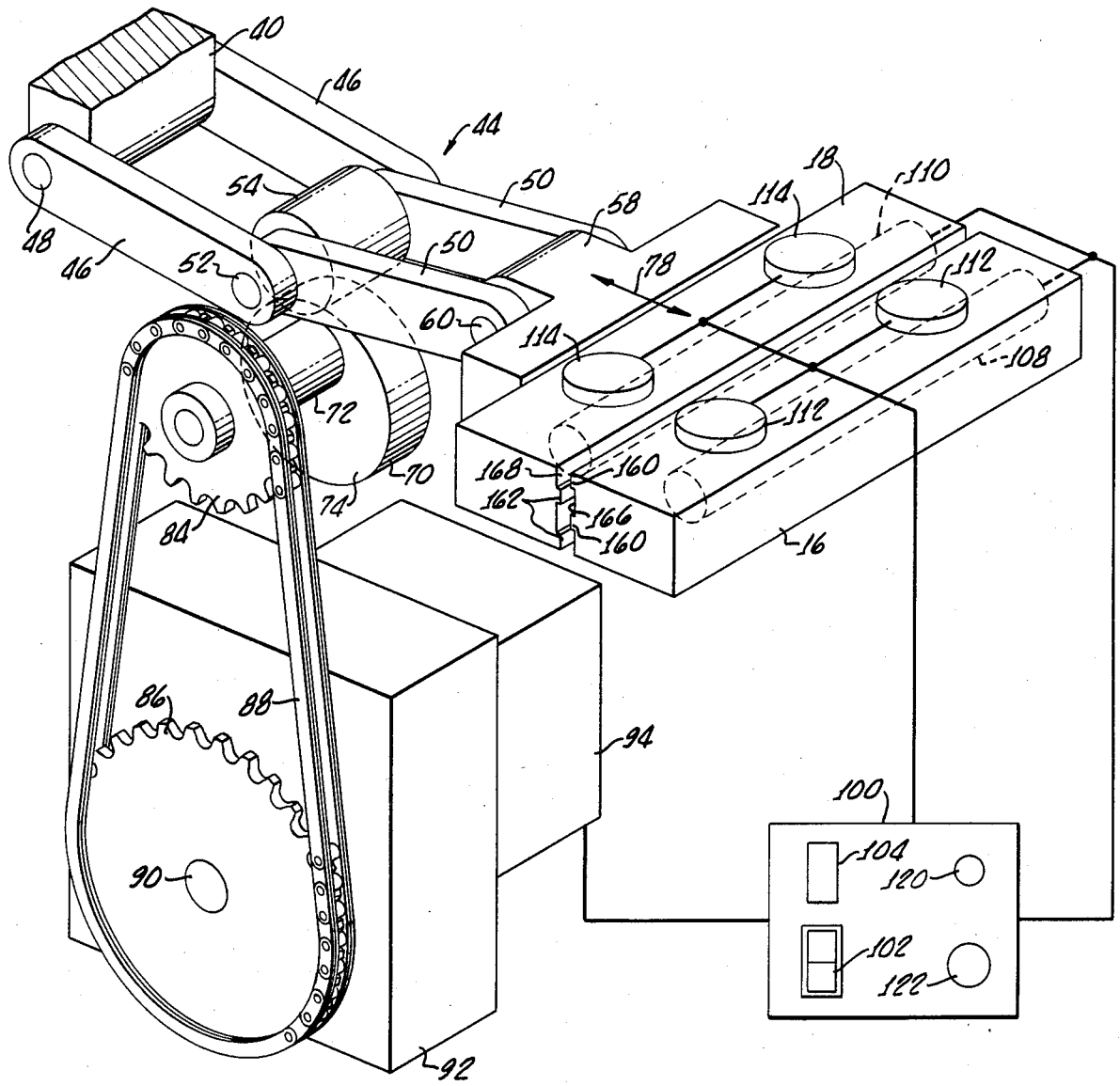
FIG. 2 is a diagrammatic perspective view of the means for mounting and moving the movable jaw from a spaced apart relationship with the fixed jaw to a closed position.
Figure 4:
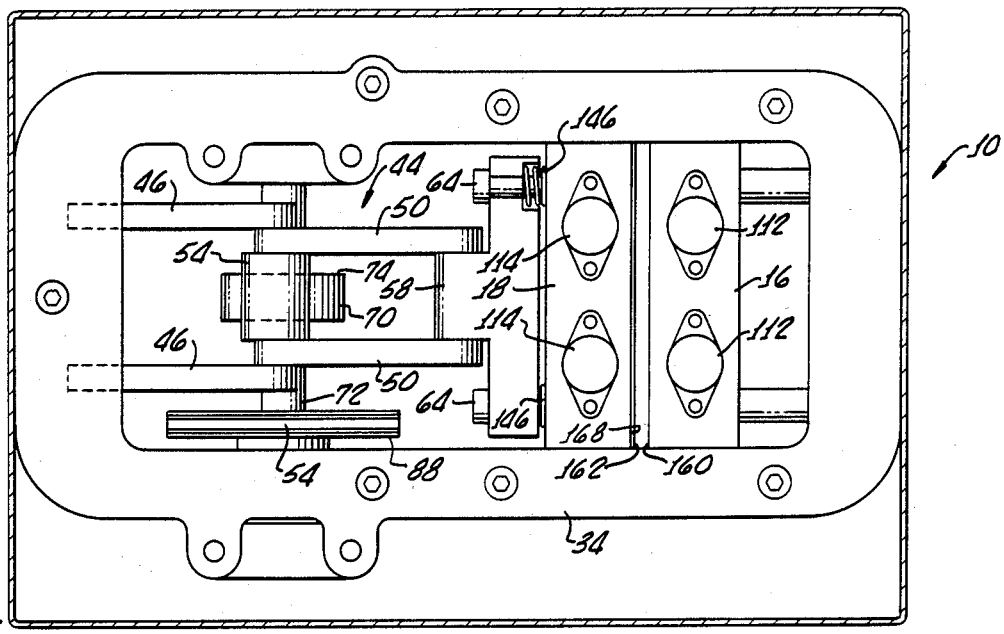
FIG. 4 is a plan view of the apparatus in accordance with the present invention.

Turning now to FIG. 1, there is shown apparatus 10 in accordance with the present invention for sealing plastic coated paperboard cartons 12 which are manually placed between a fixed jaw 16 and a movable jaw 18.

As hereinafter described in greater detail in connection with the sealing operation, a contoured base 22 provides a guide means including a recess 24, for positioning the carton by means of contact with a bottom 28 thereof to align carton sealable portions 30 between the fixed jaw 16 and movable jaw 18 with the carton sealable portions 30 being adjacent the fixed jaw 16.

Figure 3:
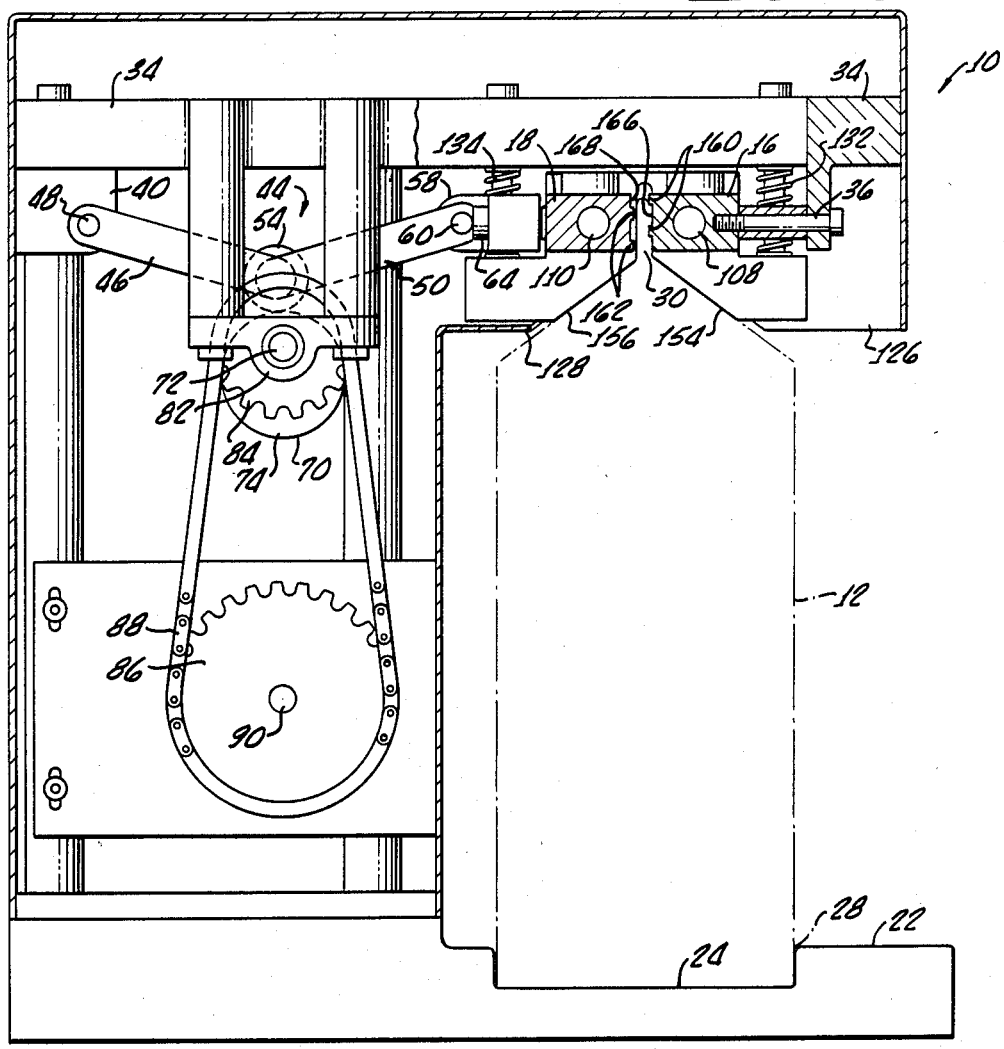
FIG. 3 is an elevation view of apparatus in accordance with the present invention, partly broken away to show the fixed and movable jaws and a contoured base disposed in a spaced apart relationship with the jaws for supporting the bottom of a carton.

As shown in FIGS. 2 and 3, the fixed jaw 16 is mounted to a frame 34 by means of bolts 36, or the like, (FIG. 3) and the movable jaw 18 is mounted to a portion 40 of the frame 34 by means of a cam controlled lever linkage 44 for enabling controlled movement of the movable jaw 18 from a spaced apart relationship with the fixed jaw 16 as shown in FIG. 2 to a closed position, as hereinafter described, for providing sealing pressure to the sealable portions 30 of the carton 12 disposed between the fixed and movable jaws 16, 18.

More particularly, the linkage 44 includes arms 46 pivotally mounted to the frame portion 40 by means of a pin 48, or the like, and interconnected with arms 50 by means of a second pin 52 with a coaxially mounted driven roller 54 disposed between the arms 50. The arms 50 are further attached to a jaw support 58 by means of a shaft, or pin 60, the jaw support 58 being attached to the jaw in a conventional manner such as bolts 64, or the like.

A drive roller 70 is mounted for engagement with the driven roller 54 on a shaft 72.

The drive roller 70 is non-coaxially mounted on the shaft 72, in order that upon rotation of the shaft 72, a portion 74 of the drive roller distal from the shaft 72 rotates upwardly to move the driven roller 54, as well as the arms 46, 52, so as to move the movable jaw 18 in directions to and from (as indicated by arrow 78) the fixed jaw along slots 80 (FIG. 3).

The shaft 72 is conventionally mounted to a frame portion 82 and driven by means of sprockets 84, 86, interconnected by a belt 88 with a movement thereof provided by a drive shaft 90 disposed in an operative relationship with a gear box 92 and an electrical motor 94.

The motor 94 is interconnected to a control system 100 conventionally arranged for providing electrical power to the motor 94 for a specific duration of time in order to rotate the drive roller 70 one revolution, and therefore, more the movable jaw 18 a complete cycle from an open position, to a closed position, and thereafter to an open position during a period of approximately 12 seconds.

It should be appreciated that the cycle time may be varied by the motor speed and the duration of the power applied thereto. It has been found that when the temperature of the jaws is between about 260° F. and about 340° F., a cycle time of approximately 12 seconds is suitable for both preheating the sealable portions 30 of the carton 12 and the sealing thereof.

It has been found that with jaw temperatures of about 260° F. to 340° F., the sealable portion 30 can remain in contact with the fixed jaw for up to about one (1) minute without losing seal integrity.

Higher jaw temperatures promote the remelting, or unsealing of the carton sealable portions 30, soon after the compression and sealing thereof by the jaws 16, 18.

It is important to note that if a higher jaw temperature is utilized, as would be suggested by prior art devices, the carton sealable portions could not remain in contact with the heated jaws after sealing; otherwise, remelting and opening of the seal would occur.

Commercial sealing devices utilizing rollers and an automatic drive mechanism for passing the cartons therethrough do not address this problem, as the contact time between the cartons and the rollers is very short.

Following the guidelines set forth in prior art sealing devices, it would be expected that higher temperatures are necessary for the sealing of cartons. While higher temperatures may be utilized in a jaw sealer, such as the present invention, higher temperatures would require the movement of both jaws in order to ensure quick separation between the jaws and the carton after sealing. It is obvious that this type of an arrangement would require another lever linkage system (not shown) which would double the mechanical complexity of the present invention, as well as significantly increasing the cost thereof.

Hence, it has been found that for a specific temperature range, it is possible for the apparatus 10 of the present invention to utilize a fixed jaw 16 against which carton sealable portions 30 may be held adjacent thereto before, during and after the sealing thereof without subsequent reopening or rupturing of the seal formed therebetween.

Turning briefly again to the control system 100, it includes an additional conventional circuitry (not shown) operating controls such as power switch 102 and a power indication light 104. The circuitry 100 is interconnected with heating elements 108, 110, disposed, respectively, within the jaws 16, 18.

The temperature of the jaws 16, 18 is independently determined by sensors 110, 112 mounted respectively on the jaws 16, 18 and interconnected to the control system 100. The sensors 110, 112 may incorporate thermostatic switches (not shown) or the control system 100 may incorporate well known automatic switching circuitry (not shown) to enable the regulation of the temperature of the jaws 16, 18 to preselected levels.

It is most important that the fixed jaw 16 be regulated within the temperature range of 260° F. to about 340° F., while the movable jaw 18 may be regulated within that temperature range, or at a higher temperature, depending upon the cycled time of the movable jaw movement and the pressure created on the carton sealable portions 30.

A temperature ready light 120 may be provided to indicate when the jaws 16, 18 are heated to the proper temperature and a conventional circuitry provided (not shown) interconnecting a start switch 122 to enable the operation of the motor 94 and subsequent movement of the jaw 18 only upon the jaws 16, 18, achieving the preselected temperature.

Turning to FIGS. 1 and 3, guide blocks 126, 128, provide fairing means for moving the carton sealable portions 30 together as the carton 12 is manually pushed between the fixed jaw 16 and the movable jaw 18 along the contoured base 22 and within the recessed area 24.

The guide blocks 126, 128 may be formed from any suitable material, such as a phenolic or teflon, resistant to the jaw heat and are mounted respectively to the frame 34, in a spaced apart relationship with the jaws 16, 18, by means of springs 132, 134 (FIG. 3). The guide blocks 126, 128 also serve to insulate a carton 12 top portion 140 from the jaws 16, 18.

The springs 132, 134 serve to align the carton sealable portions with one another prior to sealing by the jaws 16, 18.

It is important that the top edges 144 of the carton sealable portion 30 (FIG. 5) are aligned to provide maximum sealing surface between the sealable portions 30 to ensure reliable sealing.

The guides 126, 128 include initial contact surfaces 150, 152 for causing closure of the sealable portions 30 towards one another and engagment surfaces 154, 156 for bearing against the top portions 140 of the carton in order to align the sealable portions 30 with one another and provide aligned top edges 144, which are then sealed.

The linkage apparatus 44, driven by the motor 94, provides an overall pressure to the carton sealable portions 30 through the jaw 16, 18 of at least 100 pounds per square inch. However, by adjustment of the linkage apparatus 44 and mounting springs 146 pressures to the carton sealable portions may be as high as 1000 pounds per square inch or more.

This pressure is distributed to the sealable portions 30 by means of ribs 160, 162, disposed respectively on the fixed jaw 16 and movable jaw 162.

For a quart sized container, the jaws 16, 18 have general dimensions of about ⅝ inches in height and 4 inches in length. The ribs 160, 162 extend longitudinally along a face 166, 168 of the jaws 16, 18, and provide about 0.17 inch of the surface area for each rib 160, 162, the ribs having dimensions of about 0.042 inches in height and about 4 inches in length.

The ribs 160, 162 may have a depth, that is, extension from the jaw faces 166, 168, of approximately 0.030 inches and are positioned along the jaw faces 166, 168 in a non-aligned relationship with one another in order to concentrate pressure applied to the jaws onto the carton sealable portions 30 and to enhance heat transfer thereto.

As was hereinabove noted, the apparatus of the present invention is useful in the marketing of freshly squeezed juices, such as orange juice, in cartons 12 such as shown in FIG. 5. These cartons 12 have a top portion 140 including a well known fold pattern 174 as shown in FIG. 6.

The carton is formed from a paperboard material having approximately 1 millimeter thickness including a thin coating of polyethylene thereon, as is well known in the art.

As can be seen from FIG. 6, the folding pattern of 174 provides for four layers 180, 182, 184, 186 of paperboard to be sealed together to complete the sealing of the carton 12. The total thickness, after sealing, as shown in FIG. 7, is approximately 3 millimeters.

In operation, the carton base 22 is slid along the recess 24, with the top foldable portions 140 initially folded so that the layers 180, 186 engage the surfaces of 150, 152 on the guides 126, 128. Continued movement of the carton to align it between the jaws 16, 18 further closes the paperboard layers 180, 182, 184, 186 against one another between the jaws 16, 18, which are generally spaced apart a distance of approximately ¼ of an inch.

The spacing of the jaws has a secondary importance in the retail environment, in that it is sufficiently small to prevent the inadvertent insertion of users' fingers therebetween, thereby causing a burn or crushing thereof. In addition, the guides 126, 128 are insulated and prevent the contact of users' body with the heated jaws.

After the jaws have reached a preselected temperature, the ready light goes on and thereafter the start button may be pushed to operate a single cycle of the movable jaw 18 movement. The heat and pressure applied to the carton sealable portions 30 causes a sealing of fusion of the polyethylene coating on the paper stock to form a seal as shown in FIG. 7.

Because the folded edges 192 of the layers 182, 184 may not meet upon the closure of the seal, thereby producing a gap between the layers 180, 186, a fusible wax 194, or the like, may be placed on the inside surface of the paperboard surface 186. The wax 194 is melted during sealing of the sealable portions 30 at pressures of near 100 pounds per square inch to provide and ensure a complete seal between the layers 181, 186, as shown in FIG. 7, with the fusible material 194 filling the void (not shown) which may otherwise exist if it were not present. This is a common practice in the sealing of the cartons usable with the apparatus 10 of the present invention. At high pressure sealing of the cartons, such as possible with the present invention, as hereinbefore described, the use of the fusible wax 194 may not be necessary.

Although there has been described hereinabove a specific arrangement of apparatus for sealing of plastic coated paperboard cartons in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention, as defined in the appended claims.

I claim:

1. Apparatus for sealing plastic coated paperboard cartons comprising:
   a frame;
   a fixed jaw mounted to said frame;
   a movable jaw;
   means for heating said fixed and movable jaws;
   means for mounting said movable jaw to said frame for enabling controlled movement of said movable jaw from a spaced apart relationship with said fixed jaw to a position for providing sufficient pressure to sealable portions of a carton disposed between the fixed and movable heated jaws to cause sealing of said sealable portions;
   means for moving said movable jaw; and
   temperature regulation means connected in an operative relationship with the heating means for enabling said carton sealable portions to remain adjacent to said fixed jaw after sealing thereof without causing unsealing of said carton sealable portions.

2. The apparatus in accordance with claim 1 further comprising guide means for enabling manual placement of the carton sealable portions between said fixed and movable jaws and adjacent to said fixed jaw.

3. The apparatus in accordance with claim 2 wherein said guide means includes a contoured base interconnected with said frame in a spaced apart relationship for supporting a bottom of said carton in order to position said carton sealable portions between said fixed and movable jaws and adjacent to said fixed jaw.

4. The apparatus in accordance with claim 3 further comprising fairing means disposed adjacent said fixed and movable jaws for moving the carton sealable portions together as the carton is manually pushed between the fixed and movable jaws along the contoured base.

5. The apparatus in accordance with claim 4 wherein said fairing means is operative for aligning the carton sealable portions with one another.

6. Apparatus for sealing plastic coated paperboard cartons comprising:
   a frame;
   a fixed jaw mounted to said frame;
   a movable jaw;
   means for heating said fixed and movable jaws;
   means for mounting said movable jaw to said frame for enabling controlled movement of said movable jaw from a spaced-apart relationship with said fixed jaw to a position for providing sufficient pressure to sealable portions of a carton disposed between the fixed and movable heated jaws to cause sealing of said sealable portions;
   means for moving said movable jaw;
   guide means for enabling manual placement of the carton sealable portions between said fixed and movable jaws and adjacent to said fixed jaw, said guide means including a contoured base interconnected with said frame in a spaced-apart relationship for supporting a bottom of said carton;
   fairing means disposed adjacent said fixed and movable jaws for moving the carton sealable portions together and aligning the carton sealable portion with one another as the carton is manually pushed between the fixed and movable jaws along the contoured base, said fairing means being spring-mounted to the fixed and movable jaws for aligning the carton's sealable portions with one another; and,
   temperature regulation means connected in an operative relationship with the heating means for enabling said carton sealable portions to remain adjacent to said fixed jaw after sealing thereof without causing unsealing of said carton sealable portions.

7. The apparatus in accordance with claim 1 wherein the temperature regulation means maintains the fixed jaw at a temperature between about 260° F. and about 340° F.

8. The apparatus in accordance with claim 7 wherein the temperature regulation means maintains the fixed jaw at a temperature of about 300° F.

9. The apparatus in accordance with claim 1 or 6 wherein the temperature regulation means maintains the fixed jaw and the movable jaw at a temperature between about 260° F. and about 340° F.

10. The apparatus in accordance with claim 7 wherein the temperature regulation means maintains the fixed jaw and the movable jaw at a temperature of about 300° F.

11. The apparatus in accordance with claim 7 wherein the temperature regulation means maintains the movable jaw at a higher temperature than said fixed jaw.

12. The apparatus in accordance with claim 7 wherein the means for mounting said movable jaw and means for moving said movable jaw provide a pressure to the carton sealable portion greater than about 100 psi.

13. The apparatus in accordance with claim 1 or 7 wherein the means for moving the movable jaw includes a cam controlled lever means for causing transverse movement of the movable jaw to and from the fixed jaw in a continuous preselected time cycle.

14. The apparatus in accordance with claim 1 or 7 wherein the means for moving said movable jaw includes a motor interconnected with said cam controlled lever mechanism, said means for moving said movable jaw providing a sinusoidal time cycle of about 12 seconds.

15. The apparatus in accordance with claim 13 wherein the means for mounting said movable jaw provides for a maximum spaced apart distance with said fixed jaw of ⅜ inch.

16. The apparatus in accordance with claim 13 wherein the fixed and movable jaws each have means defining ribs on faces of the jaws for engaging the carton's sealable portions in order to concentrate pressure applied to the jaws into the carton's sealable portions and to enhance heat transfer thereto.

17. The apparatus in accordance with claim 16 wherein the ribs are disposed longitudinally along the jaw faces and are placed on each jaw face so that they are not aligned with one another.

18. Apparatus for sealing polyethylene coated paperboard cartons comprising:
a frame;
a fixed jaw mounted to said frame;
a movable jaw;
means for heating said fixed and movable jaws;
means for mounting said movable jaw to said frame for enabling controlled movement of said movable jaw from a spaced-apart relationship with said fixed jaw to a position for providing sufficient pressure to folded top portions of said polyethylene coated paper cartons to cause fusion of the polyethylene coating thereon to form a seal therebetween;
means for moving said movable jaw;
guide means for enabling manual placement of the carton folded top portion between the heated fixed and movable jaws and adjacent to the heated fixed jaw; and,
temperature regulation means connected in an operative relationship with the heating means for maintaining the movable and fixed jaws at preselected generally constant temperatures, said preselected temperatures enabling said carton folded portions to remain adjacent to said fixed jaw after sealing thereof without causing unsealing of said carton folded portions.

19. Apparatus for sealing plastic coated paperboard cartons comprising:
a frame;
a fixed jaw mounted to said frame;
a movable jaw;
means for heating said fixed and movable jaws;
means for mounting said movable jaw to said frame for enabling controlled movement of said movable jaw from a spaced-apart relationship with said fixed jaw to a position for providing sufficient pressure to sealable portions of a carton disposed between the fixed and movable heated jaws to cause sealing of said sealable portions;
means for moving said movable jaw; and
temperature regulation means connected in an operative relationship with the heating means for maintaining the movable and fixed jaws at preselected, generally constant temperatures, said preselected temperatures enabling said carton sealable portions to remain adjacent to said fixed jaw after sealing thereof without causing unsealing of said carton sealable portions.

20. The apparatus in accordance with claim 19 wherein the temperature regulation means maintains the fixed jaw at a preselected generally constant temperature between about 260° F. and about 340° F.

21. The apparatus in accordance with claim 20 wherein the temperature regulation means maintains the fixed jaw at a preselected generally constant temperature of about 300° F.

22. The apparatus in accordance with claim 19 wherein the temperature regulation means maintains the fixed jaw and the movable jaw at preselected generally constant temperature between about 260° F. and about 340° F. respectively.

23. The apparatus in accordance with claim 22 wherein the temperature regulation means maintains the fixed jawa and the movable jaw at a preselected generally constant temperature of about 300° F.

* * * * *